United States Patent [19]
Yamada et al.

[11] Patent Number: 6,114,068
[45] Date of Patent: Sep. 5, 2000

[54] SHEET FOR FORMING A POLYMER GELLED ELECTROLYTE, A POLYMER GELLED ELECTROLYTE USING IT, AND A METHOD FOR MANUFACTURE THEREOF

[75] Inventors: Teruyuki Yamada; Seiji Hayashi; Yoshihiko Hosako; Mitsuo Hamada, all of Otake, Japan

[73] Assignee: Mitsubishi Rayon Co., Ltd., Tokyo, Japan

[21] Appl. No.: 09/072,982

[22] Filed: May 6, 1998

[30] Foreign Application Priority Data

May 6, 1997 [JP] Japan ................................. 9-115770
Sep. 29, 1997 [JP] Japan ................................. 9-264271

[51] Int. Cl.[7] .......................... H01M 10/40; H01G 9/022
[52] U.S. Cl. .......................... 429/300; 429/303; 429/309; 429/314; 252/62.2
[58] Field of Search .................... 429/300, 303, 429/304, 305, 306, 188, 309, 314; 252/62.2

[56] References Cited

U.S. PATENT DOCUMENTS

| | | |
|---|---|---|
| 4,994,335 | 2/1991 | Kamaei et al. . |
| 5,639,573 | 6/1997 | Oliver et al. . |
| 5,639,574 | 6/1997 | Hubbard et al. . |
| 5,658,685 | 8/1997 | Oliver . |
| 5,665,265 | 9/1997 | Gies et al. . |
| 5,783,331 | 7/1996 | Inoue et al. . |
| 5,858,264 | 3/1997 | Ichino et al. . |
| 5,939,222 | 10/1997 | Senyarich et al. . |

*Primary Examiner*—Maria Nuzzolillo
*Assistant Examiner*—Susy Tsang
*Attorney, Agent, or Firm*—Oblon, Spivak, McClelland, Maier & Neustadt, P.C.

[57] ABSTRACT

The present invention provides a unique fibrous sheet for forming a polymer gel electrolyte having ion conductivity, a unique polymer gel electrolyte using such a sheet, and a unique method for the manufacture thereof. More specifically, the present invention provides a unique fibrous sheet for forming a polymer gel electrolyte having excellent ion conductivity and suitable as an electrolyte for various electronic devices such as lithium primary batteries, lithium secondary batteries, and electric double layer capacitors, as well as a unique polymer gel electrolyte using such a sheet, and also a unique method for the manufacture thereof.

16 Claims, 1 Drawing Sheet

SHEET FOR FORMING A POLYMER GELLED ELECTROLYTE, A POLYMER GELLED ELECTROLYTE USING IT, AND A METHOD FOR MANUFACTURE THEREOF

BACKGROUND OF THE INVENTION

1. Field of Invention

The present invention relates to a fibrous sheet for forming a polymer gel electrolyte having ion conductivity, to a polymer gel electrolyte using such a sheet, and to a method for the manufacture thereof. More specifically, the present invention relates to a fibrous sheet for forming a polymer gel electrolyte having excellent ion conductivity and suitable as an electrolyte for various electronic devices such as lithium primary batteries, lithium secondary batteries, and electric double layer capacitors, to a polymer gel electrolyte using such a sheet, and to a method for the manufacture thereof.

2. Description of the Related Art

Lithium batteries containing a complex lithium oxide such as $LiCoO_2$, $LiMn_2O_4$, and $LiNiO_2$ as a positive electrode active material, a Li alloy or a carbonaceous material capable of intercalating and deintercalating Li as a negative electrode active material, and a mixture of a nonaqueous solvent and an electrolyte salt as a battery electrolyte, demonstrate high performance and excellent rechargeable characteristic. For this reason they have found wide application as power sources for personal computers, cellular phones, minidisks, minicomponent systems, etc., and are being studied as environmentally friendly power sources for automobiles.

Nonaqueous electrolyte batteries that have been developed in the past used organic solvents such as an ethylene carbonate or a propylene carbonate for electrolytic solutions. For this reason, when such batteries were exposed to a high temperature atmosphere, they could be internally or externally short circuited which resulted in an increase of the battery temperature. There has been a drawbacks in that, in such a case, the electrolytic solution evaporates and the battery may explode or ignite.

Accordingly, polymer gel electrolytes that are easier to handle than the liquid electrolytes and which have a high ion conductivity and demonstrate no solvent evaporation have been studied as electrolytes which do not leak from lithium secondary batteries like the nonaqueous electrolytic solution. For example, Japanese Laid-open Patent Publication No. Hei7-245122 discloses the utilization of a gel prepared by crosslinking polyethylene oxide triol with a difunctional isocyanate, and Japanese Laid-open Patent Publication No. Hei6-96800 discloses the utilization of a gel-like crosslinked substance polyether polyol acrylate. Furthermore, J. Polymer Sci. Polymer Physics, Vol. 21, 1983, pp. 939–948 and Japanese Laid-open Patent Publication No. Hei8-264205 discloses a method for the preparation of a polymer gel electrolyte by mixing a small amount of powdered polyacrylonitrile with ethylene carbonate and propylene carbonate, then by dissolving an electrolyte in the mixture followed by mixing and casting the same.

Polymer gel electrolytes produced from crosslinked products such as polyesters and polyol acrylates, or from polyol and isocyanate adducts, have a low ion conductivity of about $10^{-5}$ S/cm and their performance is inadequate for battery applications. In order to increase the ion conductivity, it is necessary to decrease the crosslinking density of the gel electrolyte and to increase the electrolyte content. However, solid electrolytes manufactured by such a method have a decreased strength, which is undesirable. From the industrial standpoint, a low strength in gel electrolytes is a fatal disadvantage because it prohibits the application of a continuous battery assembly process. Furthermore, when using a method comprised of dissolving a powdered acrylonitrile polymer in a nonaqueous solvent and followed casting, the acrylonitrile polymer shows a poor solubility in nonaqueous solvents, and aggregates of the acrylonitrile polymer particles are easily formed in the dissolution process, which makes it impossible to produce a high-quality gel electrolyte sheet. (For example, if a polymer for forming gel electrolyte is placed into a heated solvent, only the surface of particles is swollen due to dissolution, and the particles having such a swollen layer stick to each other and form aggregates having a diameter from several millimeters to several tens of millimeters. Such particle associations are coated with a surface layer which is dissolved by the solvent and has a high resistance to solvent diffusion. This layer impedes the dissolution of the internal part of these associations. Furthermore, in such a state, these aggregates are extremely difficult to break and dissolve, even by applying a shear force to the solution by stirring.) In addition, a gel sheet manufactured using acrylonitrile polymer solutions has a non-uniform thickness and its electric properties can be easily degraded.

TECHNICAL PAPERS, ELECTROCHEMICAL SCIENCE AND TECHNOLOGY, J. Electrochem. Soc., Vol. 142, No. 3, March 1995, p. 683, discloses a solid polymer electrolyte prepared by filling micropores in a polyethylene microporous membrane with a solid electrolyte manufactured from polytetraethylene glycol diacrylate. Although this solid polymer electrolyte shows a high strength, its ion conductivity is as low as $2 \times 10^{-4}$ S/cm and its characteristics are inadequate because of its physical structure and properties of the polymer electrolyte used for its manufacture. Furthermore, film-like solid polymer electrolytes prepared by impregnating filter papers or nonwoven fabrics made of synthetic fibers with the above-described solid polymer electrolyte are also known, but thin films of such solid electrolytes are difficult to be produced, and a uniform film thickness cannot be obtained. Moreover, its ion conductivity is not higher than $10^{-4}$ S/cm and its characteristics are also inadequate.

SUMMERY OF THE INVENTION

The inventors have successfully completed the present invention thereof various studies aiming at the development of sheets for forming polymer gel electrolytes, which are very easy to handle and which can be used to obtain sheet-like polymer gel electrolytes having a uniform thickness and a high ion conductivity. The first of the present inventions provides a fibrous sheet for forming a polymer gel electrolyte having ion conductivity, which comprising a fibrous sheet-like material having a thickness of not less than 10 μm and produced from at least one material selected from a fibrous or pulp-like material of an organic polymer soluble in or plasticizable with a nonaqueous electrolytic solution. The second of the present inventions provides a fibrous sheet for forming a polymer gel electrolyte having ion conductivity, which is obtained by integrating a support layer A comprising at least one material selected from a fibrous, pulp-like, or fibril-like material of an organic or inorganic substance insoluble in or nonplasticizable with a nonaqueous electrolytic solution and a matrix phase B consisting of at least one substance selected from a fibrous or pulp-like material of a polymer soluble in or plasticizable with the nonaqueous electrolytic solution, and then forming into a fibrous sheet having a thickness of not less than 10 μm.

A polymer gel electrolyte having ion conductivity and a method for the manufacture thereof are also provided which comprise the step of impregnating the fibrous sheet of the first or second invention with a nonaqueous electrolytic solution, then heating to dissolve or plasticize the component which is soluble in or plasticizable with the nonaqueous electrolytic solution, and followed by cooling to gel the polymer component that was dissolved in or plasticized with the nonaqueous solvent.

DETAILED DESCRIPTION OF THE PREFERED EMBODIMENTS OF THE INVENTION

As for the polymer soluble in or plasticizable with a nonaqueous electrolyte solution to be used in the present invention, examples may be found in polymers having acrylonitrile polymerized with content of not less than 50 mol %, more specifically not less than 80 mol %, such as polyacrylonitrile or acrylonitrile-based copolymer, aromatic polyamides, acrylate or methacrylate homopolymers or copolymers, vinylidene fluoride copolymers, polysulfones, polyallyl sulfones, polyvinyl acetate, and acrylamide-based copolymers. Among these polymers, the acrylonitrile-based polymer having an acrylonitrile polymerized unit content of not less than 50 mol %, more specifically not less than 80 mol % is extremely useful as a starting material for forming a highly ion conductive polymer gel electrolyte because it has CN groups in a side chain and it is a polymer having a high dielectric constant. For the purpose of increasing the affivity of an acrylonitrile-based polymer to a nonaqueous electrolyte solution or of increasing the ion conductivity of a polymer gel electrolyte made from this polymer, an acrylonitrile-based polymer is preferably used wherein the polymer basing obtained by copolymerizing less than 50 mol %, more specifically less than 20 mol %, of such polymer as acrylic acid, methacrylic acid, itaconic acid, vinylsulfonic acid, methacrylonitrile methallylsulfonic acid, acrylamide, alkoxy(polyalkylene glycol) (meth)acrylate, vinyl acetate, vinyl chloride, perfluoroalkylvinyl ethers, (meth)acrylates, butadiene, or perfluoroalkyl(meth) acrylates. Because aromatic polyamides are heat-resistant polymers, it is possible to obtain a heat-resistant polymer gel electrolyte, whereby such gel electrolyte can be made to have an excellent heat resistance.

The above-mentioned fibrous or pulp-like polymer material can be obtained by dissolving the above-described polymer or its melt by heating the olymers to obtain a spinning solution and then using such method as a melt-spinning method, a wet spinning method, a dry-wet spinning method, a flash spinning method, or Flash Jet Wet Coagulating method solidification method described in Japanese Lid-open Patent Publication No. Hei9-241917. It is preferred that the length of this fibrous or pulp-like material is no longer than about 10 mm. The diameter of fibers or fibrils is preferably not more than 30 $\mu$m, more preferably, about 3 to 10 $\mu$m. When a fibrous sheet is obtained comprising fibrils having a size of less than several micron, a preferable condition is obtained wherein the fibrils are easily entangled.

Examples of the substance, substantially insoluble in or nonplasticizable with nonaqueous electrolytic solutions, to be used in accordance with the present invention may be found in inorganic substances such as flint glass, glass fibers, glass flakes, alumina fibers, ceramic fibers, etc., and polyethylene, polypropylene, polymethylpentene, polystyrene, polyamides, polyesters, polyimides, aromatic polycarbonates, and styrene-butadiene copolymers and the like. These organic polymers are used in the form of a fibrous material comprising short fibers having a length not more than about 5 mm, a pulp-like material, or a fibrous material. The fibrous or pulp-like material can be obtained from the organic polymer by a melt spinning method, a wet spinning method, a flash spinning method, and a Flash Jet Wet Coagulating method and the like. The diameter of fibers is preferably not more than 30 $\mu$m, more preferably within a range from about 3 to 10 $\mu$m. The length of fibers in the pulp-like material or short fibers is preferably not more than 10 mm.

As for the manufacturing method of the fibrous sheet in accordance with the present invention, the following methods may be employed.

The first method comprises of the steps of; dispersing in water short fibers or a pulp-like material of a polymer soluble in or plasticizable with a nonaqueous electrolytic solution, and then forming a sheet by using a paper making method thereby forming a fibrous sheet having a thickness of about 5 to 300 $\mu$m.

The second method comprises the steps of; dispersing a polymer in the form of short fibers or a pulp-like material (corresponds to a matrix phase B), which is soluble in or plasticizable with a nonaqueous electrolytic solution, and a substance in the form of short fibers or a pulp-like material (corresponds to a support phase A), which is insoluble in or nonplasticizable with a nonaqueous electrolytic solution, in water, and then forming the dispersion into a fibrous sheet having a thickness of about 5 to 300 $\mu$m by using a paper making method.

Such fibrous sheets produced by the above paper making method provided an excellent uniformity in properties with a high mechanical strength and are suitable as sheets for fabricating polymer gel electrolytes with ease in handling, good impregnability with nonaqueous electrolytic solutions, a high ion conductivity, and uniform characteristics.

The fibrous sheet fabricated by the second method contains as a support phase a fibrous or pulp-like material of a substance which is insoluble in or nonplasticizable with a nonaqueous electrolytic solution. As a result, the mechanical strength of the polymer gel electrolyte fabricated with such a fibrous sheet can be even higher. Furthermore, if this fibrous sheet-like material is heat treated, the fibrous or pulp-like material insoluble in a nonaqueous electrolytic solution becomes fused together and forms a micro porous network inside the fibrous sheet, thereby further increasing its strength.

It is important that the fibrous or pulp-like material of a polymer insoluble in a nonaqueous electrolytic solution to form the matrix phase of the fibrous sheet-like material in accordance with the present invention should not become bonded with an adhesive or thermally fused.

The third method for the manufacture of the fibrous sheet comprises the step of; entangling a fibrous or pulp-like material of a polymer soluble in or plasticizable with a nonaqueous electrolytic solution with a support phase A comprising a nonwoven fabric, woven cloth, or knitted cloth, fabricated by using fibers having a diameter of not more than approximately 30 $\mu$m and being made of a substance which is insoluble in or nonplasticizable with the nonaqueous electrolytic solution, thereby forming a matrix phase B.

In particular, such a method comprises the steps of; laminating a paper-like sheet comprising short fibers or a pulp-like material of a polymer soluble in or plasticizable with a nonaqueous electrolytic solution produced by the above-described method of either 1 or 2, on one side or both sides of a woven or knitted sheet forming the support phase A, and then entangling the matrix phase B with the support phase A by needle punching or by air jet (loom) or water jets (loom) on one surface or both surfaces of the laminate.

The fourth method for the manufacture of the fibrous sheet comprises the steps of; producing a cloth or knitting from composite fibers made of a polymer soluble in a nonaqueous electrolytic solution and a polymer insoluble in the nonaqueous electrolytic solution, or producing a nonwoven fabric by dry or wet processing of the respective short fibers, preferably heat treating, to form a network structure in the support phase A, thereby forming a fibrous sheet. The composite fibers as referred to above can be fibers of a side-by-side type, fibers being of a polymer mixture, fibers of true conjugate type, composite fibers of Island-in-a-Sea type, and fibers obtained by splitting such fibers.

An important feature of a fibrous or pulp-like material of a polymer soluble in or plasticizable with a nonaqueous electrolytic solution used in accordance with the present invention is that it has fibril-like protrusions with a diameter of not more than 30 μm, specifically not more than 10 μm. Therefore, in a fibrous sheet produced from these fibrous or pulp-like materials, an effective entanglement force is effected among the fibrils thereby increasing the fibrous sheet strength. At the same time, the fibrous sheet has excellent impregnating ability with nonaqueous electrolytic solutions and makes it possible to easily form a gel electrolyte containing no undissolved portions. Fibrous or pulp-like materials with too large fiber diameters are undesirable since they are poorly impregnatable with nonaqueous electrolytic solutions and undissolved portions may tend to be formed.

It goes without saying that a fibrous sheet comprising a fibrous or pulp-like material of a substance insoluble in a nonaqueous electrolytic solution as a support phase A and a fibrous or pulp-like material of a polymer soluble in or plasticizable by the nonaqueous electrolytic solution as a matrix phase B has good impregnating ability with the nonaqueous electrolytic solution. In addition, its strength can be greatly increased and it has excellent handling property compared to the fibrous sheet containing no support phase A.

Furthermore, by impregnating a fibrous sheet comprising the support phase A and matrix phase B with a nonaqueous electrolytic solution, and heating and dissolving the matrix phase, and then gelling the same, it is possible to increase the strength of the fabricated gel electrolyte sheet, whereby the battery fabricated using such a sheet-like gel electrolyte has high safety because the sheet has a sufficient ability to follow the expansion and contraction of an active material layer during charging, thereby providing a high resistance to the battery.

The fibrous sheet in accordance with the present invention, inside which the fibrous or pulp-like material forming a support layer forms a continuous network, is especially preferred because it has a high strength and can form a sheet-like gel electrolyte having good ion conductivity.

A mixing ratio of a support phase A and a matrix phase B in the fibrous sheet in accordance with the present invention is preferably such that the content of the support phase A is 50 wt % or less. A drawback of fibrous sheets with a high content of the support phase A is that their thickness increases, and a gel electrolyte sheet produced from such a fibrous sheet has a large thickness and shows a low ion conductivity.

For this reason, it is preferred than the fibrous sheet in accordance with the present invention has a thickness of about 10 to 200 μm, preferably not more than 100 μm.

In order to produce a sheet-like polymer gel electrolyte using the above-described fibrous sheet, the sheet is impregnated with a nonaqueous electrolytic solution at a temperature higher than the melting point of the nonaqueous solvent and lower than a room temperature (about 30° C. ). If the temperature during the impregnation is too high, only the surface of the fibrous or pulp-like material produced from the polymer soluble in or plasticizable with the nonaqueous electrolytic solution will be dissolved whereby nonaqueous electrolytic solution will not penetrate to the inside of the material, which is undesirable.

A polymer gel electrolyte sheet can be obtained by dissolving the fibrous or pulp-like material impregnated with the nonaqueous electrolytic solution and then by cooling to a temperature not higher than the gelling temperature of the dissolved substance.

Depending on their solubility in solvents, polymers can be classified into two groups: those soluble at a high temperature and those soluble at a low temperature. The polymer for forming a gel electrolyte, which is used in accordance with the present invention, is of the high temperature soluble type. When a polymer of high temperature soluble types dissolved in a low-temperature solvent, the dissolution rate is low and a polymer solution thereof cannot be obtained. In such a state, the polymer starting material (generally, in a powder form) is dispersed in the solvent in a state in which they retain their initial shape, and even if the polymer is added in a large amount, it remains in a so called slurry state characterized by a low viscosity, and a homogeneous solution will be difficult to obtain even if the cooling is maintained to stir the same.

On the other hand, when an attempt is made to dissolve a polymer powder of a high-temperature solubility type by placing it into a hot solvent, the polymer powder surface is rapidly swollen and dissolved by the solvent. A problem associated with such a swollen and dissolved layer formed on the surface of polymer particles is that it easily becomes a barrier impeding the diffusion of solvent inward the particles, and the so called aggregate particles can be easily formed, which hinder the dissolution of polymer particles.

For example, if a polymer for forming gel electrolyte is placed into a hot solvent, only the surface of particles is swollen due to dissolution, whereby the particles having such a swollen layer stick to each other and form aggregates having a diameter of from several millimeters to several tens of millimeters. Such particle associations are coated with a surface layer which is dissolved by the solvent and has a high resistance to solvent diffusion. This layer impedes the dissolution of the inside of these associations by the solvent. Furthermore, in such a state, these aggregates are difficult to break and dissolve even by applying a shear force by stirring to the solution. Moreover, the same phenomenon is observed when the polymer for forming gel electrolyte is used in the form of flakes, pulp, or fibers.

In addition, significant problems arise when a polymer gel electrolyte is to be obtained by dissolving the fibrous material formed into a cloth, knitting, a nonwoven fabric, or a paper sheet and the like, because stirring then becomes impossible.

From the standpoint of preventing degradation such as decomposition of a support electrolyte used in the polymer gel electrolyte, it is undesirable to store for a long period of time at a high temperature. Therefore, heating operation of the solvent for the polymer for forming a gel electrolyte should be conducted as fast as possible. Such a minimization of time required for heating and dissolving a polymer for forming a gel electrolyte is of major significance for the industry.

The temperature at which a solvent causes the formation of slurry or swelling of the polymer for forming a gelled electrolyte in accordance with the present invention is preferably within a range from below the room temperature to the solvent melting point. In particular, the dissolution rate of a polymer containing acrylonitrile as a main component strongly depends on temperature, and such a polymer is preferred for the implementation of the method in accordance with the present invention. It is especially preferred that an acrylonitrile copolymer or polyacrylonitrile be used which has an acrylonitrile content of 50 mol % or more. Such a polymer for forming a gel, which uniformly swells or forms a slurry in a non-dissolved state, rapidly forms a homogeneous solution upon heating. The heating temperature is generally within a range of 70 to 150° C.

It is necessary that such a polymer gel electrolyte sheet is thin with a thickness of 10–200 μm, a good uniformity in thickness, a high specific dielectric constant, and a high chemical, in particular, electrochemical stability, and should demonstrate no changes in properties over a long period of time.

Specific examples of nonaqueous solvents used during the formation of the polymer gel electrolyte may be found in cyclic carbonates such as ethylene carbonate and propylene carbonate; linear carbonates such as dimethyl carbonate and diethyl carbonate; dimethyl sulfoxide, γ-butyrolactone, dimethyl formamide, dimethyl acetamide, 1,3-dimethoxethane, tetrahydrofuran, ethoxymethoxylethane and the like. From the standpoint of obtaining a polymer sheet having a good ion conductivity, it is preferred that the weight ratio of the polymer and the nonaqueous electrolytic solution be within a range of 80/20 to 5/95 (by weight).

Examples of electrolyte salts forming the nonaqueous electrolytic solution may be found in $LiClO_4$, $LiBF_4$, $LiPF_6$, $LiAsF_6$, $LiCF_3SO_2$, $LiI$, $(CH_3)_4NClO_4$, and $(C_2H_5)_4NClO_4$.

The mixing ratio of the polymer soluble in or plasticizable with the nonaqueous electrolytic solution and the nonaqueous electrolytic solution in the polymer gel electrolyte sheet in accordance with the present invention is preferably within a range of 95/5 to 20/80 by weight. In the polymer gel electrolyte sheet in accordance with the present invention containing a support phase A, the support phase A acts as a reinforcing material for the electrolyte sheet in accordance with the present invention, whereby a sheet of excellent strength can be obtained.

Furthermore, the polymer gel electrolyte sheet of the present invention can be also obtained by laminating the fibrous sheet of the present invention with a porous polymer sheet, impregnating the laminate with an electrolytic solution, and gelling after dissolution, followed by filling the porous structure of the porous sheet with the polymer component soluble in or plasticizable with the nonaqueous electrolytic solution forming the fibrous sheet. Such a method can produce a sheet having better uniformity in thickness and ion conductivity than that obtained by a method for the preparation of a polymer gel electrolyte sheet comprising the steps of coating onto a porous polymer sheet a nonaqueous electrolytic solution containing a dissolved polymer, for example, polyacrylonitrile.

A Li battery using the fibrous sheet or polymer gel electrolyte sheet of the present invention will be described below.

This Li ion battery has a structure in which a positive electrode sheet, a polymer gel electrolyte sheet, and a negative electrode sheet, are laminated. Such a battery uses a polymer gel electrolyte sheet fabricated by preparing a fibrous sheet comprising a fibrous material or pulp-like material produced from a polymer soluble in or plasticizable with a nonaqueous electrolytic solution, and then by impregnating this fibrous sheet with the nonaqueous electrolytic solution followed by gelling.

In the all-solid Li ion battery having the above-described structure, the polymer gel electrolyte has a homogeneous composition, a thin dimention, a high ion conductivity, and a high strength. The battery shows no leakage of the nonaqueous electrolytic solution, has very good safety, and demonstrates excellent characteristics.

Such a Li ion battery may be fabricated by the following method. A laminate that consists of a positive electrode provided with a positive electrode active material layer, a fibrous sheet, and a negative electrode, is introduced into a battery case, then a nonaqueous electrolytic solution is poured into the battery case under a reduced pressure or under an influence of a centrifugal force, whereby the fibrous sheet is impregnated with the nonaqueous electrolytic solution, and then the fibrous or pulp-like material is dissolved and gelled, and thereafter the battery case is sealed.

With the above-described method, a non-sticky fibrous sheet is used instead of a sticky polymer gel sheet as an element of the battery. As a result, the battery assembly process can be made to produce extremely low rate defective batteries. Furthermore, the nonaqueous electrolytic solution can be introduced into the battery at a stage close to the final stage of the battery assembly, and only a small amount of nonaqueous solvent evaporates into the atmosphere, which is preferred from the standpoint of environmental hazard protection.

In addition, in the battery fabricated by the above-described method, a good interlayer adhesion is attained between the positive electrode phase the polymer electrolyte sheet phase, and the negative electrode phase, wherebythe energy density is high and excellent cycle characteristics can be obtained.

An aluminum foil, a copper foil, a nickel foil, an aluminum bonded polyester sheet and a polyester sheet can be used as the electric collector in the battery.

A complex oxide of lithium and a transition metal can be used as the positive electrode active material comprising the positive electrode phase. Co, Ni, Mn, Fe, etc. can be used as the transition metal.

An electrode produced from metallic lithium or a lithium alloy, or graphite, needle coke, mesophase microbeads, mesophase carbon fibers, vapor-phase-deposited carbon fibers, a Fullerence carbon and nanotube carbon, can be used as the negative electrode.

In particular, such a lithium secondary battery can be fabricated by laminating a positive electrode sheetlike material, a fibrous sheetlike material, and a negative electrode sheetlike material, and then by placing the laminate into an appropriate container, whereby infiltrating the container with a nonaqueous electrolytic solution, and swelling, formed by gelling after heating and dissolving.

The fibrous sheet has a high strength and can be laminated with the positive electrode sheet and negative electrode sheet without being fractured during the lamination process. Furthermore, the fibrous sheet can be extremely favorably impregnated with the nonaqueous electrolytic solution due to a capillary effect, and a fibrous sheet using a pulp-like material as the fibrous material demonstrates a high impregnability with the nonaqueous electrolytic solution. Furthermore, in the battery using a fibrous sheet comprising a fibrous or pulp-like material, which is insoluble in a nonaqueous electrolytic solution, as a matrix phase A and a fibrous or pulp-like material of a polymer, which is soluble in or plasticizable with the nonaqueous electrolytic solution, as a matrix, the polymer gel electrolyte layer has a high strength, and a battery having excellent cycle characteristic can be obtained.

The fibrous sheet has high uniformity and comprising a sheet-like material with a thickness of about 10 to 200 μm. A battery containing a polymer gel electrolyte sheet fabricated using such a fibrous sheet has high performance characteristics.

EXAMPLES

The present invention will be explained below in greater detail with reference to its examples.

Example 1

A polymer solution with a polymer concentration being 2 wt % was prepared by dissolving an acrylonitrile-based polymer comprising 90 mol % of acrylonitrile and 10 mol % of vinyl acetate in N, N-dimethylacetamide. A container equipped with a stirrer was filled with an aqueous solution (40 wt %) of dimethylacetamide, then a shear flow was generated inside the bath by rotating the stirrer blade at a high speed, whereby the acrylonitrile-based polymer solution was dropwise added into the bath and congulated under the shear flow, and a pulp-like material of the acrylonitrile-based polymer was obtained. This pulp-like material of the acrylonitrile-based polymer was recovered from the bath, then washed and dried. The average fiber length in this pulp-like material was about 500 μm and it has a multi-branched structure with a large number of fibril-like protrusions.

The recovered pulp-like acrylonitrile-based polymer was dispersed in water, and the freeness of the dispersion was evaluated according to JIS P-8121 using a Canadian freeness tester. The value obtained after a correction for a standard temperature of 20° C. and a standard concentration of 0.3% was 340 mL. The aqueous dispersion of this pulp-like acrylonitrile-based polymer was processed by a handmade paper making process by hand according to JIS P-8209 using a standard rectangular sheet machine to obtain a fibrous sheet with a thickness of 140 μm. This sheet was cut to obtain a strip-like sample. The specific weight of the sample was determined by measuring its area and weight. The specific weight was 48 g/m². The tensile strength test of the sample was determined according to JIS P-8113. The tensile strength of the sample with a width of 15 mm was 12.2N and its breaking length was 1.7 km. This sheet-like material was semitransparent with white color and similar to paper. A disk with a diameter of 42 mm was punched out of the sheet-like material using a punching machine. The punched sheet was impregnated with a propylene carbonate solution containing 1M LiPF$_6$ as an electrolyte. The impregnated sheet supported the nonaqueous electrolytic solution having a weight 1.8 times that of the fibrous sheet, and was a non-transparent material with a light scattering capacity.

This sheet impregnated with the nonaqueous electrolytic solution was placed into a sealed container and was heat treated for 12 h at a temperature of 80° C., and then gelled by cooling. The gel was observed under crossed Nicol prism using a polarization microscope. The observation demonstrated that the sheet before the heat treatment had an anisotropic structure due to a pulp-like polymer, whereas the heat treated sheet had no such anisotropic structure. This result confirmed the formation of a polymer gel electrolyte. The tensile strength of the polymer gel electrolyte was 8.8–9.8 N. As for the strength retention coefficient, the strength of the electrolyte was 70–80% of that of the initial sheet. The polymer gel electrolyte sheet was in a semitransparent state and could be compressed in the direction of its thickness. No syneresis of the solvent that could be attributed to the compression was observed. The thickness of the polymer gel-like sheet was about 170 μm.

Electric characteristics of the polymer gel electrolyte were evaluated by an AC impedance method. A precision LCR meter (HP4284A) manufactured by Hewlett-Packard Co. containing an electrode (HP-16451B) for measuring properties of dielectrics was used for measurements. The measurements were conducted in a dry box by an electrode contact method where a sample was pressed against a metallic electrode equipped with a guard (diameter 38 mm). The dielectric constant at room temperature was $1.2 \times 10^{-3}$ S/cm.

Example 2

A polymer solution with a polymer concentration of 18 wt % was prepared by dissolving a mixture containing a polyacrylonitrile-based polymer used in Example 1 and a polyvinylidene fluoride-based polymer at a weight ratio of 1:1 in dimethylacetamide. The polymer solution was spun from a metallic spinneret into an aqueous solution containing 55 wt % of N, N-dimethylacetamide. The spun fibers were washed in boiling water, cascade stretched at a ratio of four, and further stretched between the heated rolls at a ratio of two to give fibers with an average monofilament size of 3.9 dtex. The fibers were cut to a length of about 5 mm, and dispersed in water, and then subjected to beating for 10 min in a household mixer. A portion of the dispersion after the beating process was sampled and dried. The morphology of the obtained fibrous material was studied using a scanning electron microscope. The majority of the fibers were beaten and split into fibril-like fibers mostly with a diameter of about 0.3 μm. The freeness was 290 mL.

A paper-like sheet was prepared in the same manner as in Example 1 using an aqueous dispersion of this fibril-like fibrous material. The obtained paper-like sheet had a specific weight of 42 g/m², a tensile strength of 9.1 N (at a sample width of 15 mm), and a breaking length of 1.5 km. The white sheet was nontransparent with white color similar to paper.

This sheet was impregnated with a nonaqueous electrolytic solution and subjected to heat treatment in the same manner as in Example 1. The heat-treated sheet was observed under a crossed Nicol prism using a polarization microscope. No anisotropic structure was observed, and the product was confirmed to have been formed from a polymer gel sheet. The tensile strength of this polymer gel sheet was 6.8 N and it retained 75–80% strength of the initial sheet. The gel sheet was semitransparent and could be compressed in the direction of its thickness. No syneresis of the solvent that could be attributed to the compression was observed. Polymer gel thickness was about 130 μm and its electric conductivity at room temperature was $3.8 \times 10^{-3}$ S/cm.

Example 3

A polymer solution with a polymer concentration of 18 wt % was prepared by mixing the polyacrylonitrile-based polymer used in Example 1 with a polymethyl methacrylate at a weight ratio of 4:1 and dissolving the mixture in dimethylacetamide. The polymer solution was spun into an aqueous solution of dimethylacetamide with a concentration of 55 wt % via a spinneret. The spun fibers were washed in boiling water and cascade stretched at a ratio of 3.5 and then further stretched at a ratio of 2 with heated rolls to give fibers with a monofilament size of 6.1 dtex. The fibers were cut to a length of about 5 mm. These short fibers were dispersed in water and subjected to beating for 10 min in a household mixer to give fibers with a freeness of 420 mL.

An aqueous dispersion of these fibers was processed into a sheet in the same manner as in Example 1 using a standard rectangular sheet machine, and a fibrous sheet was obtained. This fibrous sheet had a specific weight of 45 g/m$^2$, a tensile strength of 8.3 N (at a sample width of 15 mm), and a breaking length of 1.3 km. This fibrous sheet was a nontransparent white product similar to paper.

This sheet was impregnated with a nonaqueous electrolytic solution and subjected to heat treatment in the same manner as in Example 1. The heat-treated sheet was observed under a crossed Nicol prism using a polarization microscope. No anisotropic structure was observed, and the product was confirmed to have been formed from a polymer gel sheet. The tensile strength of this polymer gel electrolyte sheet was 5.2 N and it retained 60–65% strength of the initial sheet. The polymer gel electrolyte sheet was in a semitransparent state and could be compressed in the direction of its thickness. No syneresis of the solvent that could be attributed to the compression was observed. The electric conductivity of the sheet at room temperature was $2.5 \times 10^{-3}$ S/cm.

Example 4

A polymer solution with a polymer concentration of 18 wt % was prepared by mixing the polyacrylonitrile- based polymer used in Example 1 with a polyimide-based polymer (manufactured by Ciba Geigy Co., trade name Matrimid 5218) soluble in N, N-dimethylacetamide at a weight ratio of 2:1 and dissolving the mixture in N, N-dimethylacetamide. The polymer solution was spun via a spinneret into an aqueous solution of dimethylacetamide with a concentration of 60 wt %. The spun fibers were washed in boiling water, cascade stretched at a ratio of 3.5 and then further stretched at a ratio of 1.5 with heated rolls to give fibers with a monofilament size of 6.1 dtex. The fibers were cut to a length of about 5 mm, dispersed in water and subjected to a beating process for 10 min in a household mixer to give short fibers with a freeness of 90 mL. These short fibers were observed under an electron microscope. They were found to have a large number of fibrils.

An aqueous dispersion of the fibers obtained in the above-described manner was processed into a sheet in the same manner as in Example 1 by a paper making process by hand using a standard rectangular sheet machine. The obtained fibrous sheet had a specific weight of 40 g/m2, a tensile strength of 15 N (at a sample width of 15 mm), and a breaking length of 2.5 km. This fibrous sheet was a light yellow nontransparent product similar to paper.

This sheet was impregnated with a nonaqueous electrolytic solution, subjected to heat treatment, and gelled by cooling in the same manner as in Example 1. The polymer gel electrolyte sheet had a tensile strength of 12 N, and it retained about 80% strength of the fibrous sheet used as a starting material. This polymer gel electrolyte sheet could be compressed in the direction of its thickness. No syneresis of the solvent, that could be attributed to compression, was observed. The dielectric constant of the sheet at room temperature was $2.8 \times 10^{-3}$ S/cm.

Example 5

A polymer solution with a polymer concentration of 20 wt % was prepared by mixing the polyacrylonitrile-based polymer used in Example 1 with a polyallylsulfone-based polymer (manufactured by Teijin Amoco Co., polyphenylsulfone, trade name RADEL R-5000) at a weight ratio of 1:1 and by dissolving the mixture in N, N-dimethylacetamide. The polymer solution was jetted sprayed into water at a temperature of 30° C. to give a coagulated pulp-like fibrous polymer. The process was conducted using a Flash Jet Coagulating method disclosed in Japanese Laidopen Patent Publication No. Hei9-241917 and using a nozzle in which an angle between a central line of a polymer solution channel and a central line of a steam flow inlet channel was 60 degrees in the center of the bottom of a tubular mixing cell with a diameter of 2 mm and a length of 1.5 mm, which had a ring-like steam flow channel with a width of 250 µm on the periphery of the cell. The polymer solution supply rate was 18 mL/min and the steam supply pressure was 147 kPa.

This coagulated pulp-like polymer was dispersed in water and subjected to a beating process for 10 min in a household mixer. A portion of the aqueous dispersion subjected to the beating process was sampled and dried to give pulp-like fibers. The morphology of these fibers was studied using a scanning electron microscope. They were found to be fibril-like fibers with a diameter of about 0.2 µm. The freeness of the pulp-like fibers was 180 mL.

An aqueous dispersion of the pulp-like fibers obtained in the above-described manner was processed into a sheet in the same manner as in Example 1 by using a standard rectangular sheet machine. The obtained fibrous sheet had a specific weight of 42 g/m$^2$, a tensile strength of 11 N (with a width of 15 mm), and a breaking length of 1.7 km. This fibrous sheet was a white nontransparent product similar to paper.

This fibrous sheet was impregnated with a nonaqueous electrolytic solution in the same manner as in Example 1 and subjected to heat treatment and cooling for the purpose of polymer gelling. As a result, a polymer gel sheet was obtained. The polymer gel electrolyte sheet had a tensile strength of about 80% of that of the initial fibrous sheet. This polymer gel electrolyte sheet could be compressed in the direction of its thickness. No syneresis of the solvent, that could be attributed to the compression, was observed. The electric conductivity of the sheet at room temperature was $3.8 \times 10^{-3}$ S/cm.

Example 6

A polymer solution with a polymer concentration of 4% was prepared by dissolving a polyacrylonitrile-based polymer containing 95 mol % acrylonitrile and 5 mol % vinyl acetate unit in N, N-dimethylacetamide. A bath equipped with a stirrer blade was filled with an aqueous solution (10%) of N, N-dimethylacetamide, and a shear flow was generated in the bath by rotating the stirrer blade at a high rate. As a result, a coagulating bath was obtained. The above-mentioned acrylonitrile-based polymer solution was dropwise added to the coagulating bath and coagulation was induced under a shear flow to give a pulp-like polyacrylonitrile-based copolymer. This pulp-like polymer was recovered from the bath, then washed and dried.

Then, 70 parts by weight of the recovered pulp-like polyacrylonitrile-based copolymer and 30 parts by weight of a polyethylene pulp (manufactured by Mitsui Petrochemicals Co., SWP E790) were dispersed in water, and a sheet was formed according to JIS P-8209 using a standard rectangular sheet machine. The sheet was dried and heat treated at a temperature of 125° C. under pressure to give a paper-like fibrous sheet. Polyethylene pulp fibers forming a support phase A in this fibrous sheet were fused together forming a porous phase. The resulting white nontransparent sheet was similar to paper.

The polyacrylonitrile copolymer sheet obtained in the above-described manner was cut to obtain a strip-like sample. The specific weight of the sample was determined by measuring its area and weight. The specific weight was 48 g/m2. The tensile strength of the sample was determined according to JIS P-8113. The tensile strength of a sample with a width of 15 mm was 22.0 N.

This fibrous sheet was punched using a punching machine to give a disk with a diameter of 42 mm. This disk-like fibrous sheet was impregnated with a propylene carbonate solution containing 1M $LiPF_6$ as an electrolyte. The fibrous sheet after impregnation held the nonaqueous electrolytic solution 1.5 times its own weight.

The fibrous sheet impregnated with the nonaqueous electrolytic solution was placed into a sealed container and heat treated by holding for 12 hr at a temperature of 80° C. Then, it was cooled to room temperature to dissolve and gel the pulp-like mass of the polyacrylonitrile-based polymer. The resulting sheet had a thickness of about 150 µm. The polyethylene pulp component present in the sheet was not dissolved in the nonaqueous electrolytic solution and retained a network structure. Electric characteristics of the polymer gel sheet fabricated in the above-described manner were evaluated in accordance with Example 1 by an AC impedance method. The measurements were conducted in a dry box after the sample was pressed to a metallic electrode equipped with a guide and with a diameter of 38 mm by an electrode contact method. Electric conductivity of the polymer gel electrode sheet was $1.5 \times 10^{-3}$ S/cm.

Example 7

A spinning solution was prepared by dissolving 25 parts by weight of an acrylonitrile-based polymer consisting of 95 mol % acrylonitrile and 5 mol % vinyl acetate in 75 parts by weight of N, N-dimethylacetamide. The spinning solution was wet spun to give acrylonitrile-based fibers with a size of 1.1 dtex. The fibers were cut to a length of 5 mm. The 70 parts by weight of the obtained chopped fibers and 30 parts by weight of the polyethylene pulp (manufactured by Mitsui Petrochemicals Co., SWP E790) used in Example 6 were dispersed in water. The dispersion was molded into a sheet according to JIS P-8209 using a standard rectangular sheet machine. The resulting sheet was dried and heat treated at a temperature of 125° C. under pressure to give a paper-like sheet with a thickness of 72 µm. Polyethylene pulp fibers in the obtained fibrous sheet fused together and formed a porous support phase A.

The obtained fibrous sheet had a specific weight of 42 g/m², a tensile strength of 28.7 N at a sample width of 15 mm, and a breaking length of 1.7 km. This fibrous sheet was a white transparent product similar to paper.

This fibrous sheet was impregnated with a nonaqueous electrolytic solution in the same manner as in Example 1 and then allowed to stay at normal temperature until the acrylonitrile fibers swelled and the sheet became semitransparent. Electric properties of the obtained polymer gel electrolyte sheet were measured. The sample thickness was about 125 µm, and the electric conductivity at room temperature was $2.8 \times 10^{-3}$ S/cm.

Example 8

A spinning solution prepared by dissolving 18 parts by weight of the polyacrylonitrile-based copolymer prepared in Example 7 in 82 parts by weight of N, N-dimethylacetamide was wet spun to give fibers with a size of 0.22 dtex. The fibers were cut to a length of 5 mm and the cut fibers were dispersed in water to obtain a cut fiber concentration of 0.3 wt %.

An aqueous dispersion of these fibers was poured onto the upper surface of a polyester woven cloth or fabric (specific weight 50 g/m²) transported at a rate of 5 m/min over a net, and water was absorbed from the under surface of the fabric to form a paper-like nonwoven fabric layer comprising cut fibers of the acrylonitrile-based polymer. Then, water jet was sprayed under a high pressure on the surface of the nonwoven fabric layer consisting of cut fibers of the acrylonitrile-base polymer in order to entanglement the cut polyacrylonitrile fibers with the polyester cloth and the sheet thus obtained was dried. The resulting composite fibrous sheet had a thickness of 350 µm and a weight ratio of polyester fibers to cut polyacrylonitrile-based fiberswas 2/3.

This composite fibrous sheet was impregnated with a nonaqueous electrolytic solution in the same manner as in Example 1 and allowed to stay at normal temperature till the acrylonitrile fibers swelled, heated, cooled and the sheet became semitransparent. As a result, a polymer gel electrolyte sheet was obtained. The polyester fibers were insoluble in the nonaqueous electrolytic solution and formed a support phase in the polymer gel sheet. Ion conductivity of this polymer gel electrolyte sheet was $5.4 \times 10^{-3}$ S/cm.

Example 9

A spinning solution prepared by dissolving 18 parts by weight of the polyacrylonitrile-based copolymer used in Example 7 in 82 parts by weight of N, N-dimethylacetamide was wet spun to give fibers 0.22 dtex. The fibers were cut to a length of 5 mm and the cut fibers were dispersed in water to a cut fiber concentration of 0.3 wt %.

An aqueous dispersion of these fibers was poured onto the upper surface of a polypropylene woven or fabric cloth as a substrate (specific weight 25 g/m²) transported at a rate of 5 m/min over a net, and water was removed from the under surface of the substrate to form a paper-like nonwoven fabric layer consisting of cut fibers of the acrylonitrile-based polymer. Then, water jet was sprayed under a high pressure on this surface in order to entangled the cut polyacrylonitrile fibers with the polypropylene cloth and the sheet thus obtained was dried. The resulting composite fibrous sheet had a thickness of 300 µm and a weight ratio of polypropylene fibers to cut polyacrylonitrile-based fibers of 2:3. This composite fibrous sheet was heat treated under applied pressure at a temperature of 145° C., then the polypropylene fibers were fused, and a fibrous sheet was obtained having a support phase with a porous structure.

This fibrous sheet was impregnated with a nonaqueous electrolytic solution in the same manner as in Example 1 and allowed to stay at a normal temperature until the acrylonitrile fibers swelled, heated, cooled and the sheet became semitransparent. As a result, a polymer gel electrolyte sheet was obtained. The polypropylene fibers present in the polymer gel sheet were insoluble in the nonaqueous electrolytic solution and formed a porous support phase.

Ion conductivity of this polymer gel electrolyte sheet was $5.4 \times 10^{-3}$ S/cm at room temperature.

Example 10

A dispersion was prepared by dispersing in water the pulp-like polyacrylonitrile-based copolymer (freeness 340 mL) obtained in Example 1, and a fibrous sheet was prepared using a tilted Pourdrinier paper machine. This fibrous sheet was cut to obtain a continuous fibrous sheet with a width of 10 cm. This fibrous sheet had a specific weight of 32 g/m² and an average thickness of 120 μm. The tensile strength of the fibrous sheet was 6.8 N at a sample width of 15 mm. The breaking length was 1.44 km.

This continuous fibrous sheet was laminated with an aluminum foil sheet with a thickness of 25 μm, and the laminate was coiled onto a glass rod with a diameter of 2 mm to give a spiral-like assembly with a diameter of 15 mm. This spiral-like assembly was inserted into a FEP thermally shrinkable tube (diameter 17 mm), and the tube was shrunk by heating with an industrial drier to obtain a model cell for a cylindrical battery.

This model cell was secured inside a suction bell jar and degassed under reduced pressure for 15 min using a vacuum pump. Then, a nonaqueous electrolytic solution (1M LiPF$_6$ solution in propylene carbonate) was dropwise added from one side to infiltrate the acrylonitrile-based copolymer fibrous sheet inside the model cell with the nonaqueous electrolytic solution.

The model cell impregnated with the nonaqueous electrolytic solution was removed from the suction beil jar and the rolled assembly was released by cutting the thermally shrunk tube. The impregnation with the nonaqueous electrolytic solution of a roll-like sheet obtained by loosening the rolled assembly was studied. Visual observation showed that the fibrous sheet was uniformly impregnated with the nonaqueous electrolytic solution, and no portions were found that remained unimpregnated. Furthermore, a portion of the sheet was cut and observed under an optical microscope. The observations at a magnification of 200 to 500 showed that the nonaqueous electrolytic solution penetrated between the pulp fibers constituting the sheet. No unimpregnated portions such as fine bubbles were found.

Then, both ends of the model cell impregnated with the nonaqueous electrolytic solution that was fabricated as described above were sealed, and the cell was heat treated by holding it for 12 hr at a temperature of 80° C. and cooled to room temperature. When the model cell was disassembled, it was found that the fibrous sheet was dissolved by the nonaqueous electrolytic solution, polymer gelled, and bonded to the aluminum foil. When the aluminum foil was peeled off and the state of the polymer gel sheet was studied, the polymer gel sheet was found to be semitransparent and compressible in the direction of its thickness. No syneresis of the nonaqueous electrolytic solution that could be attributed to compression was observed. The impregnated sheet was studied under a crossed Nicol prism using a polarization microscope before and after the heat treatment. Before the heat treatment, the fibrous sheet impregnated with the nonaqueous electrolytic solution had an anisotropic structure based on the pulp-like polymer, whereas the polymer gel sheet after heat treatment demonstrated no anisotropic structure.

Example 11

A polymer solution with a polymer concentration of 20 wt % was prepared by mixing a polyacrylonitrile-based polymer produced by Example 1and a polyvinylidene fluoride polymer at a weight ratio of 1:1 and dissolving the mixture in dimethylacetamide. The polymer solution was jetted into water at a temperature of 30° C. by a jet solidification process employed in Example 5 to give a coagulated pulp-like fibrous polymer. The polymer solution supply rate was 18 mL/min and the steam supply pressure was 147 kPa.

This coagulated pulp-like polymer was dispersed in water and subjected to a beating process for 10 min in a household mixer. A portion of the aqueous dispersion subjected to beating was sampled and dried. The morphology of the product was studied using a scanning electron microscope. Fibril-like fibers with a diameter of about 0.2 μm were observed. Their freeness was 180 mL.

A fibrous sheet with a specific weight of 24 g/m² and an average thickness of 105 μm was prepared according to Example 1 by using a standard rectangular sheet machine and forming a sheet of an aqueous dispersion of the pulp-like polymer obtained by beating. The sheet obtained was dried. The tensile strength of this fibrous sheet was 3.6 N at a sample width of 15 mm; its breaking length was 1.03 km.

The fibrous sheet fabricated in the above-described manner was squeezed between two aluminum foils having a thickness of 25 μm. The resulting composite sheet was inserted into a sac obtained by heat sealing one end of a cylindrical fusible film. In this process, a microsyringe tip was inserted into the sac. The sac was set into a vacuum heat sealing apparatus, and pressure was reduced for 3 min. Then, a nonaqueous electrolytic solution prepared by dissolving 1M LiPF$_6$ in propylene carbonate was injected through the syringe, and the fibrous sheet consisting of pulp-like polymer was impregnated with the nonaqueous electrolytic solution inside the sac. The open end of the sac was then heat sealed to give a model cell of a thin battery.

The model cell was decomposed and the state of nonaqueous electrolytic solution impregnation into the pulp-like polymer gel sheet was visually studied. The whole sheet was wetted with the nonaqueous electrolytic solution and no unimpregnated portion was found. Furthermore, this fibrous sheet was also studied under an optical microscope with a magnification of 100 to 500. The space between the fibers in a pulp forming the fibrous sheet was found to be completely filled with the nonaqueous electrolytic solution. No gaps or small bubbles were observed. Furthermore, the fibrous sheet was also studied under a crossed Nicol prism using a polarization microscope. The anisotropy caused by the pulp-like material was observed.

A model cell of a thin battery fabricated by the same method as described above was heat treated for 12 hr at a temperature of 80° C. and cooled to room temperature. No bubble formation was observed inside the model cell of the heat-treated battery. When the model cell was disassembled, it was noted that the fibrous sheet was swelled/dissolved by the nonaqueous electrolytic solution, gelled, and bonded to the aluminum foils. The polymer gel sheet was peeled off the aluminum foils and studied. It was found to be semitransparent and compressible in the direction of its thickness. No syneresis of the nonaqueous electrolytic solution that could be attributed to compression was observed. Furthermore, the polymer gel sheet was observed under a crossed Nicol prism using a polarization microscope. An anisotropic structure formed by the pulp-like polymer was not observed, and the pulp-like aggregate was found to be gelled.

Example 12

A pulp-like polymer was manufactured that was produced in Example 1. This pulp-like polymer was mixed with ultrafine polyacrylonitrile-based cut fibers (manufactured by Mitsubishi Rayon Co., Ltd., trade name Vonnel M. V. P. D 122) at a weight ratio of 1:2. The mixture was dispersed in water, and the resulting aqueous dispersion was processed into a paper-like fibrous sheet by a wet papermaking method.

A model cell of a thin battery was fabricated in the same manner as in Example 11 using this fibrous sheet. The model cell was heat treated in the same manner as in Example 11 and then cooled to room temperature. When the model cell was opened and the fibrous sheet was studied, the sheet was found to be completely impregnated with the electrolytic solution and dissolved which resulted in the formation of a polymer gel. The polymer gel sheet was studied under a crossed Nicol prism using a polarization microscope. An anisotropic structure was observed that could be attributable to ultrafine polyacrylonitrile-based fibers.

Example 13

FIG. 1 is a cross section of a thin-sheet secondary battery utilizing the polymer gel electrolyte in accordance with the present invention. The structure of the secondary battery using the polymer gel electrolyte in accordance with the present invention and a method for the manufacture thereof will be explained below with reference to FIG. 1.

Negative Electrode:

In FIG. 1, the reference numeral 1 stands for a negative electrode collector made of a copper foil with a thickness of 10 μm. The copper foil was coated with a paste prepared by adding a negative electrode active material to a polyvinylidene fluoride solution in N-methyl-2-pyrrolidone. The negative electrode active material comprises fine carbon particles capable of intercalating and deintercalating lithium ions. The coating was dried and rolled to give a negative electrode having a negative electrode active material layer 2. A binder may also be used in this process.

Positive Electrode:

In FIG. 1, the reference numeral 3 stands for a positive electrode collector made of an aluminum foil with a thickness of 25 μm. The aluminum foil was coated with a paste prepared by mixing $LiCoO_2$ particles as a positive electrode active material and electrically conductive carbon black at a weight ratio of 95:5, and then kneading the mixture obtained with a polyvinylidene fluoride solution in N-methyl-2-pyrrolidone. The coating was dried and pressed to give a positive electrode having a positive electrode active material layer 2.

Polymer Gel Electrolyte Sheet:

Reference numeral 5 stands for a polymer gel electrolyte prepared by impregnating a sheet comprising a pulp-like polymer with an electrolytic solution and gelling by subsequent treatment such as heat treatment. The sheet comprising a pulp-like polymer was fabricated by the method employed in Example 1 and comprised the steps of; preparing a pulp-like polymer comprising a polyacrylonitrile-based polymer, beating the obtained pulp-like polymer, and manufacturing a fibrous sheet by a wet papermaking method. A polymer solid electrolyte was formed by impregnating the obtained sheet with an electrolytic solution according to the method used in Examples 1, 2, and 3. Blends of polyacrylonitrile-based polymer with other polymers, for example, polyvinylidene fluoride, polyamides, aromatic polyamides, polyolefins, polyesters, polycarbonates, polyimides, poly(meth)acrylate polyacrylonitrile, can be used instead of the polyacrylonitrile-based polymer as the pulp-like polymer. Furthermore, a sheet-like material comprising a composition prepared by adding an appropriate amount of a fibrous polymer to the pulp-like material can also be used.

Secondary Battery with a Gelled Polymer Electrolyte:

The fibrous sheet fabricated in Example 1 was inserted between the above-described negative electrode and positive electrode, and the laminate was placed between thermally fusible films 6 to give a cell. The cell was vacuum degassed following the procedure described in Example 11 to remove air present inside film 6. Then, the nonaqueous electrolytic solution employed in Example 11 was introduced into the cell, and after the cell was filled with the prescribed amount of the electrolytic solution, it was sealed.

The sealed cell was then subjected to heat treatment in the same manner as in Example 11 followed by cooling to room temperature. As a result, a thin-sheet polymer gel electrolyte secondary battery was obtained, which is shown in FIG. 1.

Thus, in accordance with the present invention, a secondary battery with a gel polymer solid electrolyte, which is easy to handle, can be obtained by simple operations, without defects or thickness nonuniformity and without the occurrence of the above-described problems associated with the electrolytic solution during the manufacturing process.

Example 14

In this example, 93.6 mol % acrylonitrile units and 6.4 mol % vinyl acetate units were placed into a glass reactor having a capacity of 2,000 mL and equipped with a jacket under the conditions such that the water/monomer ratio was 14: 1. A suspension polymerization in an aqueous system was conducted using 1.0 wt % $Na_2SO_3$, 1.5 wt % $NaHSO_3$, and 0.12 wt % $H_2SO_4$ (all based on the reaction liquid) as polymerization catalysts. The reaction temperature was maintained at 55° C. The polymer formed inside the reactor was recovered, thoroughly washed, and dried to give a white powder material. The reaction yield calculated from the weight of the obtained powder was 73%.

The elemental analysis of the obtained polymer composition showed that it contained 96.0 mol % acrylonitrile units and 4.0 mol % vinyl acetate units. Furthermore, the molecular weight of the polymer was measured by GPC. The result calculated as polystyrene was $5.1 \times 10^5$. The GPC measurements were conducted using 0.01M LiCl/DMF as a solvent at a polymer concentration of 0.1 g/dL.

A polymer solution with a concentration of 18 wt % was prepared by dissolving this acrylonitrile copolymer in N, N-dimethylacetamide. The polymer solution was spread over a slide glass, and a cast film was obtained by naturally drying the solvent. An attempt was made to measure the contact angle of propylene carbonate and diethyl carbonate on a smooth surface of the cast film by a contact angle meter. However, due to good affinity between the film and drops of liquid, the liquid spread over the film and the contact angle could not be measured.

Then, a pulp-like polymer coagulant was obtained by spinning this polymer solution into water at a temperature of 30° C. using the spinning nozzle employed in Example 5. In this process, the polymer solution supply rate was 18 mL/min and the steam was supplied under a pressure of 147 kPa.

The coagulate pulp-like polymer was dispersed in water, and the dispersion was subjected to beating for 10 min in a household mixer. A portion of the aqueous dispersion after beating was sampled and dried. The morphology of the obtained pulp-like fibers was studied using a scanning electron microscope. The fibers were discovered to have a structure in which a plurality of fibril-like fibers with a diameter of 0.2 to 1 μm branching from the fiber-like trunk with a diameter of 5 to 20 μm. The freeness value of the pulp-like polymer was 387 mL.

A wet papermaking process was conducted according to JIS P-8209 employing a standard rectangular sheet machine and using an aqueous dispersion of the pulp-like fibers obtained in the above-described manner. The specific weight of the fibrous sheet consisting of the obtained polyacrylonitrile-based copolymer was 25 g/m$^2$, and the average sheet thickness (measured according to JIS P-8118) was 155 μm. The sheet was cut to obtain a strip-like sample that was subjected to a tensile test according to JIS P-8113. The sample with a width of 15 mm had a rupture strength of 18 N/15 mm. The porosity of the sheet measured with a mercury infiltration porosimeter (CARLO ERBA INSTRUMENT Co., POROSIMETER 4000), was 68%.

The pulp-like fibrous sheet comprising this acrylonitrile-based copolymer was a porous sheet for forming a gel solid electrolyte, which was soluble in a nonaqueous electrolytic solution and had a porosity of 68%.

Example 15

A polymer containing 100 mol % acrylonitrile was prepared by an aqueous suspension polymerization method using a redox catalyst in the same manner as in Example 14. The polymer was spun and a coagulated pulp-like polymer was obtained in the same manner as in Example 14. A porous sheet for forming a polymer gel sheet electrolyte was prepared by a wet papermaking method in the same manner as in Example 1 using this pulp-like acrylonitrile polymer.

Example 16

A polymer containing 99.0 mol % acrylonitrile and 1.0 mol % vinyl acetate was prepared by an aqueous suspension polymerization method using a redox catalyst in the same manner as in Example 14. A pulp-like polymer aggregate was obtained in the same manner as in Example 14. A porous sheet for forming a gel solid electrolyte was prepared by a wet papermaking method in the same manner as in Example 1 using this pulp-like acrylonitrile-based polymer.

Example 17

A polymer containing 93.0 mol % acrylonitrile and 7.0 mol % ethyl acrylate was prepared by an aqueous suspension polymerization method using a redox catalyst in the same manner as in Example 14. A coagulated pulp-like polymer was obtained in the same manner as in Example 14. A porous sheet for forming a gel polymer electrolyte was prepared by a wet papermaking method in the same manner as in Example 1 using this pulp-like acrylonitrile-based polymer.

Example 18

A polymer containing 93.8 mol % acrylonitrile and 6.2 mol % butyl acrylate was prepared by an aqueous suspension polymerization method using a redox catalyst in the same manner as in Example 14. A coagulated pulp-like polymer was obtained in the same manner as in Example 14. A porous sheet for forming a gel solid electrolyte was prepared by a wet papermaking method in the same manner as in Example 1 using this pulp-like acrylonitrile-based polymer.

Example 19

A polymer containing 75.2 mol % acrylonitrile and 24.8 mol % butyl methacrylate was prepared by an aqueous suspension polymerization method using a redox catalyst in the same manner as in Example 14. A coagulated pulp-like polymer was obtained in the same manner as in Example 14. A porous sheet for forming a gel solid electrolyte was prepared by a wet papermaking method in the same manner as in Example 1 using this pulp-like acrylonitrile-based polymer.

Example 20

A polymer containing 85.0 mol % acrylonitrile and 15.0 mol % vinyl acetate was prepared by an aqueous suspension polymerization method using a redox catalyst in the same manner as in Example 14. A pulp-like polymer aggregate was obtained in the same manner as in Example 14. A porous sheet for forming a gel solid electrolyte was prepared by a wet papermaking method in the same manner as in Example 1 using this pulp-like acrylonitrile-based polymer.

Table 1 shows specific weight, sheet thickness, tensile strength, and porosity of porous sheets fabricated in Examples 14 20.

TABLE 1

| | | Analyzed composition | | Specific weight (g/m$^2$) | Sheet thickness (μm) | Tensile strength (N/15 mm) | Porosity (%) |
| --- | --- | --- | --- | --- | --- | --- | --- |
| | Comonomers | Acrylonitrile | Comonomers | | | | |
| Example 14 | VAc | 96.0 | 4.0 | 25 | 155 | 18 | 68 |
| Example 15 | — | 100 | — | 25 | 172 | 15 | 72 |
| Example 16 | VAc | 99.0 | 1.0 | 24 | 130 | 21 | 65 |
| Example 17 | EAA | 93.0 | 7.0 | 25 | 145 | 22 | 64 |
| Example 18 | BAA | 93.8 | 6.2 | 26 | 162 | 18 | 70 |
| Example 19 | BMA | 75.2 | 24.8 | 24 | 133 | 20 | 62 |
| Example 20 | VAc | 85.0 | 15.0 | 25 | 141 | 21 | 63 |

VAc: vinyl acetate;
EAA: ethyl acrylate;
BAA: butyl acrylate;
BMA butyl methacrylate As shown in Table 1, the sheets for forming ion-conductive gel solid electrolyte that were prepared by the wet papermaking process from a pulp-like acrylonitrile copolymer had appropriate strength and porosity.

Example 21

A disk with a diameter of 42 mm was punched out of the porous sheet for forming a gel solid electrolyte that was prepared in Example 14, using a punching machine. The punched sheet was impregnated with a propylene carbonate solution containing LiPF$_6$ as a support electrolyte at 1 mol/kg. The impregnated sheet supported the nonaqueous electrolytic solution having a weight 2.8 times that of the fibrous sheet.

This sheet impregnated with the nonaqueous electrolytic solution was placed into a sealed container, heat treated by holding it for 12 h at a temperature of 80° C., and studied under a crossed Nicol prism using a polarization microscope. The sheet before the heat treatment was found to have an anisotropic structure based on the pulp-like polymer, whereas no such anisotropic structure was observed in the heat treated sheet. The tensile strength of the sheet subjected to heat treatment was about 90% that of the fibrous sheet before the impregnation. The sheet was in a semitransparent state and could be compressed in the direction of its thickness. No oozing of the solvent, that could be attributed to compression, was observed.

Electric characteristics of the sheet were evaluated by an AC impedance method using a precision LCR meter 4284A manufactured by Hewlett-Packard Co.

The attachment used for measuring electric conductivity that was used for the measurements consisted of cylindrical stainless steel electrodes with a diameter of 14.8 mm, which were installed opposite to each other. The solid polymer electrolyte was squeezed between the electrodes. A load of 11.8 kPa was applied to the electrodes using a spring, and a tight bond between the sample and stainless steel electrodes was maintained during the measurements. The operations were conducted in a globe box filled with argon.

A complex impedance of the sample was measured by passing an alternating current with a peak voltage of 20 mV and a frequency within a range from 100 Hz to 1 MHz. The curve of the complex impedance obtained in measurements was analyzed by a Cole-Cole plot method. A point, where a coordinate axis was intersected in a high-frequency range, was considered as an electric resistance of the sample, and the electric conductivity was calculated from the electrode surface area and distance between the electrodes.

The porous sheet for forming a solid electrolyte which consisted of the pulp-like acrylonitrile-based copolymer, was impregnated with an electrolytic solution and subjected to heat treatment. The resulting material was a gel solid electrolyte sheet that was impregnated with the electrolytic solution and had high ion conductivity at room temperature.

Examples 22–27

The porous sheets for forming a gel solid electrolyte which were prepared in Examples 15–20, were impregnated with an electrolytic solution containing a support electrolyte salt in the same manner as in Example 8. The impregnation was followed by heat treatment that was conducted in a state wherein the samples were introduced into the attachment for measuring ion conductivity under applied load. Then, a strength retention ratio and ion conductivity were measured. The measurement results are shown in Table 2.

TABLE 2

| | Composition of electrol. solution (wt. %) | | | Concentration of electrolytic solution (mol/kg) | Electrolytic solution holding ratio (times) | Sheet appearance | Strength retention ratio (%) | Electric cond. (S/cm) |
|---|---|---|---|---|---|---|---|---|
| | PC | EC | Other | | | | | |
| Example 21 | 100 | — | — | 1.0 | 2.8 | gel | 90 | $5.4 \times 10^{-3}$ |
| Example 22 | 100 | — | — | 1.0 | 3.0 | gel | 86 | $4.8 \times 10^{-3}$ |
| Example 23 | 100 | — | — | 1.0 | 2.7 | gel | 92 | $5.9 \times 10^{-3}$ |
| Example 24 | 23.1 | 46.2 | EMC 30.8 | 1.0 | 2.7 | gel | 105 | $4.2 \times 10^{-3}$ |
| Example 25 | 12.3 | 55.1 | DEC 32.6 | 1.0 | 2.9 | gel | 92 | $2.3 \times 10^{-3}$ |
| Example 26 | 12.3 | 55.1 | DEC 32.6 | 1.0 | 2.6 | gel | 95 | $1.9 \times 10^{-3}$ |
| Example 27 | — | 60.0 | EMC 40.0 | 1.0 | 2.7 | gel | 110 | $9.4 \times 10^{-2}$ |

PC: propylene carbonate,
EC: ethylene carbonate,
EMC: ethylmethyl carbonate,
DEC: diethyl carbonate As shown in Table 2, the impregnation of the porous sheet prepared from the acrylonitrile copolymer with an electrolytic solution produced a solid electrolyte sheet having good electrolyte-retaining capacity and ion conductivity.

Example 28

A polymer solution with a concentration of 15 wt % was prepared by dissolving the acrylonitrile-based copolymer prepared in Example 14 in N, N-dimethylacetamide. The polymer solution was spun into an aqueous solution containing 30 wt % N, N-dimethylacetamide through a spinneret with a diameter of 30 μm. The spun fibers were washed in boiling water, stretched at a ratio of three in hot water, and then stretched at a ratio of 1.5–2 on heating rolls with a surface temperature of 150–200° C. to give fibers with a monofilament size of 0.22–0.55 dtex. The fibers were cut to a length of about 5 mm. Then 5 parts by weight of the obtained chopped fibers were mixed with 10 parts by weight of the pulp-like acrylonitrile copolymer with a freeness of 387 mL that was prepared in Example 14. The mixture was dispersed in water, and a sheet was prepared from the aqueous dispersion by a wet papermaking method.

The obtained fibrous porous sheet for forming a gel solid electrolyte had a specific weight of 25 g/m², a thickness of 180 μm, a tensile strength of 11 N/15 mm, and a porosity of 80%.

This porous sheet for forming a gel solid electrolyte was impregnated with an electrolytic solution and heat treated in the same manner as in Example 21, and its strength retention ratio and ion conductivity were measured. The solid electrolyte sheet had a strength retention ratio of 79% and an ion conductivity of $5.8 \times 10^{-3}$ S/cm.

Example 29

In this Example, 10 parts by weight of the pulp-like acrylonitrile copolymer with a freeness of 387 mL, that was prepared in Example 14, was mixed with 10 parts by weight of pulp-like polypropylene (manufactured by Mitsui Chemical Co., SWP Y600). The mixture was dispersed in water, and a sheet was prepared from the aqueous dispersion by a wet papermaking method.

The obtained porous sheet for forming a gel solid electrolyte had a specific weight of 25 g/m$^2$, a thickness of 140 μm, a tensile strength of 21 N/15 mm, and a porosity of 72%.

This porous sheet for forming a gel solid electrolyte with an electrolytic solution was impregnated with an electrolytic solution and heat treated in the same manner as in Example 21, and its strength retention ratio and ion conductivity were measured. The gel electrolyte sheet had a strength retention ratio of 98% and an ion conductivity of 8.6×10$^{-3}$ S/cm.

Example 30

The porous sheet for forming a gel solid electrolyte that was prepared in Example 29, was press heat treated using a press roll with a surface temperature of 175° C. The press heat-treated porous sheet for forming a gel solid electrolyte had a specific weight of 25 g/m$^2$, a thickness of 85 μm, a tensile strength of 33 N/15 mm, and a porosity of 52%.

This porous sheet for forming a gel solid electrolyte with an electrolytic solution was impregnated with an electrolytic solution and heat treated in the same manner as in Example 21, and its strength retention ratio and ion conductivity were measured. The gel electrolyte sheet had a strength retention ratio of 98% and an ion conductivity of 1.1×10$^{-4}$ S/cm.

Example 31

In this Example, 5 parts by weight of chopped fibers with a monofilament size of 0.22–0.55 dtex, that were prepared in Example 28, 10 parts by weight of the pulp-like acrylonitrile copolymer with a freeness of 387 mL, that was prepared in Example 14, were mixed with 10 parts by weight of pulp-like polypropylene (manufactured by Mitsui Chemical Co., SWP Y600). The mixture was dispersed in water, and a sheet was prepared from the aqueous dispersion by a wet papermaking method.

The obtained porous sheet had a specific weight of 25 g/m$^2$, a thickness of 170 μm, a tensile strength of 18 N/15 mm, and a porosity of 68%.

This porous sheet was press heat treated using a press roll with a surface temperature of 175° C. The press heat-treated porous sheet for forming a gel solid electrolyte had a specific weight of 25 g/m$^2$, a thickness of 110 μm, a tensile strength of 27 N/15 mm, and a porosity of 49%.

This porous sheet for forming a gel solid electrolyte with an electrolytic solution was impregnated with an electrolytic solution and heat treated in the same manner as in Example 8, and its strength retention ratio and ion conductivity were measured. The gel electrolyte sheet had a strength retention ratio of 99% and an ion conductivity of 8.7×10$^{-3}$ S/cm.

Example 32

In this Example, 10 parts by weight of the pulp-like acrylonitrile copolymer with a freeness of 387 mL, that was prepared in Example 14, was mixed with 10 parts by weight of pulp-like polypropylene (manufactured by Mitsui Chemical Co., SWP Y600). The mixture was dispersed in a dry state in a household mixer in which the rotation speed was decreased with a voltage transformer. As a result, the components were uniformly mixed and the mixture was opened so that it could be transported pneumatically.

The opened mixture was processed into a dry nonwoven fabric by an air layering method. The nonwoven fabric was heat treated using a press roll with a surface temperature of 175° C. The nonwoven fabric sheet after the heat treatment was a porous sheet for forming a gel solid electrolyte with a specific weight of 32 g/m$^2$, a thickness of 95 μm, a tensile strength of 24 N/15 mm, and a porosity of 42%.

This porous sheet for forming a gel solid electrolyte was impregnated with an electrolytic solution and heat treated in the same manner as in Example 21, and its strength retention ratio and ion conductivity were measured. The gel electrolyte sheet had a strength retention ratio of 99% and an ion conductivity of 7.5×10$^{-3}$ S/cm.

Figure 1:
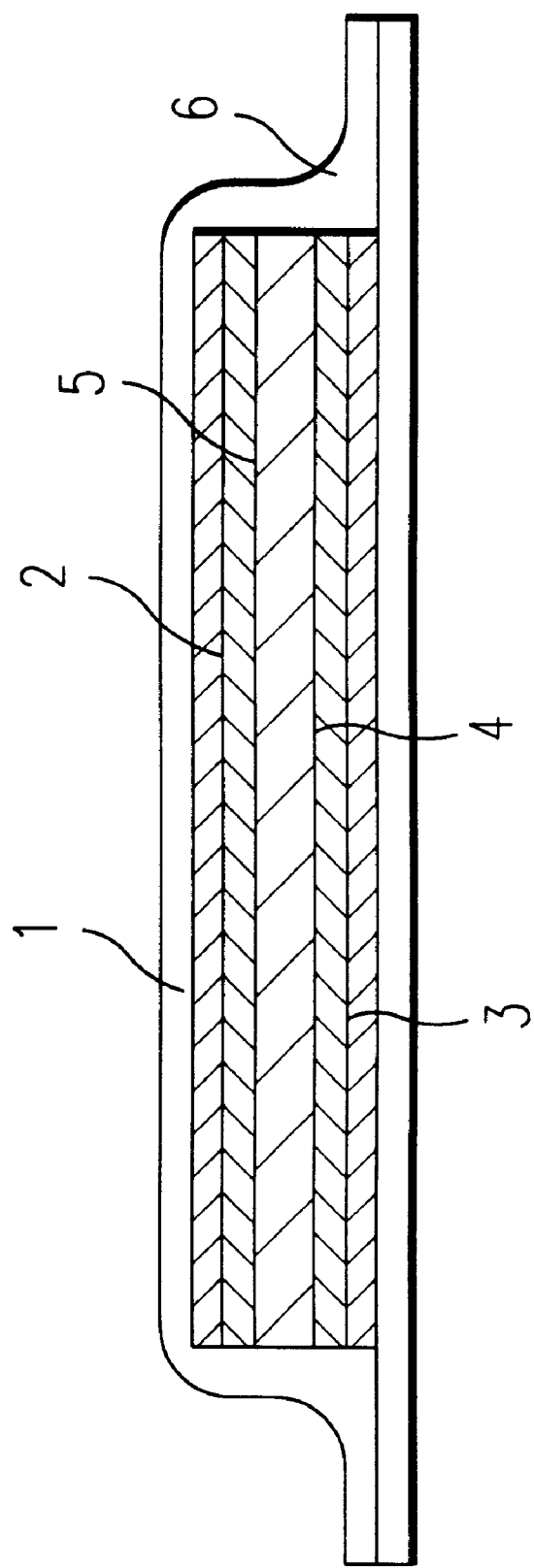
FIG. 1 is a cross section illustrating the structure of a thin sheet-like secondary battery using a polymer gel electrolyte in accordance with the present invention, where each numeral corresponds as follows.

1—negative electrode collector;
2—negative electrode active material layer;
3—positive electrode collector;
4—positive electrode active material layer;
5—polymer solid electrolyte layer;
6—fusible film.

What is claimed:

1. A fibrous sheet for forming a polymer gel electrolyte, wherein a fibrous or pulp material being made of an organic polymer soluble in or plasticizable with a nonaqueous electrolytic solution is formed into the fibrous sheet having a thickness of not less than 10 μm; and wherein said fibrous or pulp material comprises fibril protrusions having a diameter of not more than 30 μm.

2. The fibrous sheet for forming a polymer gel electrolyte according to claim 1, wherein the polymer soluble in or plasticizable with a nonaqueous electrolyte solution is comprising a polyacrylonitrile or acrylonitrile copolymer having an acrylonitrile polymerization ratio of 50 mol %.

3. The fibrous sheet for forming a polymer gel electrolyte according to claim 1, wherein the polymer soluble in or plasticizable with a nonaqueous electrolytic solution is comprises a polyacrylonitrile-based polymer having an acrylonitrile content of not less than 80 mol %.

4. A polymer gel electrolyte obtained by impregnating the fibrous sheet according to claim 1 with a nonaqueous electrolytic solution, then dissolving or plasticizing the polymer component soluble in or plasticizable with the nonaqueous electrolytic solution, and followed by gelling the same.

5. The fibrous sheet of claim 1, wherein said fibril protrusions have a diameter of not more than 10 μm.

6. A method for the manufacture of a polymer gel electrolyte, comprising the steps of: bringing the fibrous sheet described in claim 1 and a nonaqueous electrolytic solution into contact with each other at a temperature not lower than the melting point of the nonaqueous solvent and not higher than room temperature, thereby substantially impregnating the polymer component soluble in or plasticizable with the nonaqueous electrolytic solution then heat treating the fibrous sheet, and cooling the same to cause gelling.

7. The method for the manufacture of a polymer gel electrolyte according ro claim 6, wherein the temperature of heat treating the fibrous sheet impregnated with the nonaqueous electrolytic solution is within a range of 70–150° C.

8. A method for the manufacture of a polymer gel electrolyte, comprising the steps of: impregnating the fibrous sheet described in claim 1 with a nonaqueous electrolytic solution, heat treating the polymer component soluble in or plasticizable with the nonaqueous electrolytic solution, and then gelling the same.

9. The method for the manufacture of a polymer gel electrolyte as described in claim 8 or 6 wherein at least one solvent selected from the group consisting of a cyclic carbonate and a linear carbonate is used as the nonaqueous solvent component of the nonaqueous electrolytic solution.

10. The method for the manufacture of a polymer gel electrolyte according to claims 8 or 6, wherein the impregnation of the fibrous sheet with the nonaqueous electrolytic solution is conducted under a reduced pressure or under an influence of a centrifugal force.

11. A fibrous sheet for forming a polymer gel electrolyte, wherein a supporting phase A comprising an organic or inorganic fibrous or pulp material insoluble in or nonplasticizable with a nonaqueous electrolytic solution and a matrix phase B comprising a fibrous or pulp material of an organic polymer soluble in or plasticizable with a nonaqueous electrolytic solution are being integrated thereby forming the fibrous sheet having a thickness of not less than 10 $\mu$m and wherein said fibrous or pulp material of matrix phase B comprises fibril protrusions having a diameter of not more than 30 $\mu$m.

12. The fibrous sheet of claim 11, wherein said fibril protrusions have a diameter of not more than 10 $\mu$m.

13. The fibrous sheet for forming a polymer gel electrolyte according to claim 11, wherein a sheet or a long-fiber woven cloth comprises the pulp or fibrous material which forms the supporting phase A.

14. The fibrous sheet for forming a polymer gel electrolyte according to claim 13, wherein the matrix phase B is being provided on at least one surface of the supporting phases A whereby the phase show a mutually entangled structure to form the fibrous sheet.

15. A fibrous sheet for forming a polymer gel electrolyte, wherein said fibrous sheet is formed of a fibrous or pulp material consisting essentially of an organic polymer soluble in or plasticizable with a nonaqueous electrolytic solution, wherein the fibrous sheet has a thickness of not than 10 $\mu$m;

wherein said fibrous or pulp material comprises fibril protrusions: and wherein said fibril protrusions have a diameter of not more than 30 $\mu$m.

16. A fibrous sheet for forming a polymer gel electrolyte, wherein said fibrous sheet is formed by integrating, a supporting phase A comprising an organic or inorganic fibrous or pulp material insoluble in or nonplasticizable with a nonaqueous electrolytic solution; and a matrix phase B comprising a fibrous or pulp material of an organic polymer soluble in or plasticizable with a nonaqueous electrolytic solution;

wherein said organic polymer is comprised of polyacrylonitrile or an acrylonitrile copolymer having an acrylonitrile content of not less than 50 mol %; and wherein said fibrous or pulp material of matrix B comprises fibril protrusions having a diameter of not more than 30 $\mu$m.

* * * * *